United States Patent
Kawano et al.

(10) Patent No.: US 12,375,839 B2
(45) Date of Patent: Jul. 29, 2025

(54) SURVEILLANCE CONTROL DEVICE AND OPTICAL POWER SUPPLY SYSTEM

(71) Applicant: Nippon Telegraph and Telephone Corporation, Tokyo (JP)

(72) Inventors: Tomohiro Kawano, Musashino (JP); Kunihiro Toge, Musashino (JP); Chisato Fukai, Musashino (JP); Kazunori Katayama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 265 days.

(21) Appl. No.: 18/266,766

(22) PCT Filed: Dec. 16, 2020

(86) PCT No.: PCT/JP2020/046894
§ 371 (c)(1),
(2) Date: Jun. 12, 2023

(87) PCT Pub. No.: WO2022/130525
PCT Pub. Date: Jun. 23, 2022

(65) Prior Publication Data
US 2024/0056708 A1    Feb. 15, 2024

(51) Int. Cl.
*H04B 10/80* (2013.01)
*H02J 50/30* (2016.01)
*H04Q 11/00* (2006.01)

(52) U.S. Cl.
CPC .......... *H04Q 11/0062* (2013.01); *H02J 50/30* (2016.02); *H04B 10/807* (2013.01); *H04Q 2011/0083* (2013.01); *H04Q 2213/08* (2013.01)

(58) Field of Classification Search
CPC .................................................. H04B 10/807
See application file for complete search history.

(56) References Cited

U.S. PATENT DOCUMENTS

| | | | |
|---|---|---|---|
| 2015/0117864 A1* | 4/2015 | Hyde | H04Q 11/0005 398/118 |
| 2018/0287833 A1* | 10/2018 | Kennedy | H04B 10/25754 |
| 2024/0297802 A1* | 9/2024 | Kobayashi | H04B 10/807 |

FOREIGN PATENT DOCUMENTS

| | | |
|---|---|---|
| JP | 2013101644 | 5/2013 |
| JP | 201798643 | 6/2017 |

OTHER PUBLICATIONS

Helkey et al., "Remotely Powered Optical Switch for Remote Subscriber Aggregation and OTDR Measurement in PON," Presented at 33rd European Conference and Exhibition of Optical Communication, Berlin, Germany, Sep. 16-20, 2007, 2 pages.

\* cited by examiner

*Primary Examiner* — Shi K Li
(74) *Attorney, Agent, or Firm* — Fish & Richardson P.C.

(57) ABSTRACT

The disclosure provides a monitoring control device and an optical power supply system in which a system capable of remotely controlling many optical power supply type optical nodes can be economically constructed. A monitoring control device according to the present disclosure includes control means for executing power supply and power supply time allocation for selecting a control target optical node based on the amount of stored energy of a plurality of optical nodes. According to the present disclosure, in a system that includes a monitoring control device installed in a power supply environment and one or a plurality of remotely arranged optical line switching nodes, optical power supply and control of a plurality of optical switches included in the nodes and management of an amount of stored power can be simultaneously implemented with a single laser. Thus, it is possible to provide an economical optical line switching node system.

8 Claims, 10 Drawing Sheets

SURVEILLANCE CONTROL DEVICE AND OPTICAL POWER SUPPLY SYSTEM

CROSS-REFERENCE TO RELATED APPLICATIONS

This application is a National Stage application under 35 U.S.C. § 371 of International Application No. PCT/JP2020/046894, having an International Filing Date of Dec. 16, 2020, the disclosure of which is considered part of the disclosure of this application, and is incorporated by reference in its entirety into this application.

TECHNICAL FIELD

The present disclosure relates mainly to an optical node executing remote optical line switching in an optical fiber network, and to power supply and control thereof.

BACKGROUND ART

In an optical fiber network, particularly, in an access network connecting a communication service provider and an optical terminal, optical line switching such as connection of an optical fiber core to any route or changing of the route is executed at a constant frequency in order to efficiently use facilities in opening and maintenance of the optical fiber network. Such work has generally been executed by going to a site and physically executing connection switching. However, a technology of executing this remotely using an optical switch has been proposed.

For example, NPL 1 proposes a system in which a MEMS optical switch is applied to the above-mentioned optical line switching and operation power of the optical switch is provided through optical power supply via an optical fiber. Thus, power can be supplied to any installation place where there is no power source.

Further, the following technology has been proposed by focusing on only the above-described optical power supply system.

PTL 1 proposes a system in which photoelectric conversion is executed by transmitting stationary light from a monitoring device including a laser light source and an optical receiver to a wireless sensor node installed at any place away from an optical fiber, and driving power of a wireless reception signal provided in the wireless sensor node or a modulator converting a wireless signal into an uplink optical signal is obtained to communicate uplink data to the monitoring device. Thus, a broad range of many sensors can be accommodated.

Similarly, PTL 2 also proposes a system in which optical power is transmitted from a master unit that includes a laser light source for power supply and an optical transceiver having a wavelength different from that of the laser light source via an optical fiber or an optical splitter, and the optical power is used as driving power for a slave unit that includes the same optical transceiver. Thus, the slave unit can be installed even in an environment in which there is no power source.

CITATION LIST

Patent Literature

[PTL 1] Japanese Patent Application Laid-open No. 2013-101644

[PTL 2] Japanese Patent Application Laid-open No. 2017-098643

Non Patent Literature

[NPL 1] R. Helkey et al., "Remotely powered optical switch for remote subscriber aggregation and OTDR measurement in PON," 33rd European Conference and Exhibition of Optical Communication [2007]

SUMMARY OF INVENTION

Technical Problem

However, although an electrostatic mirror drive type MEMS optical switch installed remotely can be driven by optical power supply in the system disclosed in NPL 1 as described above, a remote control method necessary to select and change any port or path of the MEMS optical switch is not disclosed or clear. Further, a power supply laser is required for each node including the MEMS optical switch. Therefore, as the number of nodes increases, the number of power supply lasers increases, which results in economic inefficiency That is, in the optical power supply type optical switch in NPL 1, there is a problem that remote control is difficult and an economical increase in the number of nodes is also difficult.

In addition, paying attention to only an optical power supply system that remotely drives an optical switch, an optical power supply system in which one laser is shared by a plurality of sensor nodes is described in PTL 1. However, although there is uplink communication from the plurality of sensor nodes in the optical power supply system, an instruction to select and switch any port of the optical switch is not given from the monitoring device. That is, in the optical power supply system in PTL 1, there is a problem that it is difficult to use the sensor node as an optical line switching node.

On the other hand, the optical power supply system disclosed in PTL 2 can execute downlink communication and can be applied to control. However, in the optical power supply system, a power supply laser that has a wavelength different from that of a communication laser needs to be prepared, and a transceiver needs to be installed on the slave unit side. That is, in the power supply system disclosed in PTL 2, there is a problem that it is difficult to construct the system at a low cost.

Accordingly, an objective of the present invention is to provide a monitoring control device and an optical power supply system in which a system capable of remotely controlling many optical power supply type optical nodes can be economically constructed.

Solution to Problem

In order to achieve the above objective, a monitoring control device according to the present invention includes control means for executing power supply and power supply time allocation for selecting a control target optical node based on the amount of stored energy of a plurality of optical nodes.

Specifically, the monitoring control device according to the present invention includes:
an optical selector connected to a plurality of optical nodes that each include a storage battery storing power obtained by optical power supply and output an amount of stored energy of the storage battery as information via an optical fiber and configured to supply power supply light including a modulation period and a non-modulation period to a selected one of the optical nodes via the optical fiber and receive light including the information from the optical node; and a control unit configured to determine the optical node to be selected by the optical selector based on the amount of stored energy of each of the optical nodes.

An optical power supply system according to the present invention includes the monitoring control device, and a plurality of optical nodes connected to the optical selector of the monitoring control device by the optical fiber.

The monitoring control device installed in a power environment can simultaneously implement optical power supply to a plurality of remotely arranged optical nodes with a single laser beam, control of each optical node, and management of an amount of stored power of each optical node by using the optical selector. Thus, it is possible to construct an economical optical power supply system.

Accordingly, the present invention can provide a monitoring control device and an optical power supply system capable of economically constructing a system capable of remotely controlling many optical power supply type optical nodes. A specific control scheme is as follows.

In the monitoring control device according to the present invention, the control unit may set a threshold in each of the optical nodes, calculate a possible standby time in which the amount of stored energy decreases and reaches the threshold for each of the optical nodes, and determine the optical node to be selected by the optical selector in ascending order of the possible standby time so that a total power supply time of all the nodes becomes maximum.

The optical node may include a functional unit that executes a predetermined operation using power of the storage battery.

The control unit
may predict the possible standby time for all the optical nodes after the functional unit of one arbitrary optical node is caused to execute the predetermined operation,
may switch the optical selector so that the one arbitrary optical node is selected when all the predicted possible standby times are longer than a predetermined value, and may await the switching of the optical selector when one of the predicted possible standby times is shorter than the predetermined value.

The functional unit of the optical node may be an optical path switching unit that arbitrarily switches a plurality of optical paths. The optical power supply system can be used as a remote operational optical switch that connects an optical fiber core to any route in opening and maintenance in an access network connecting a communication service provider and an optical terminal and performs optical line switching to change the route. Access network facilities can be efficiently used.

Advantageous Effects of Invention

According to the present invention, it is possible to provide a monitoring control device and an optical power supply system in which a system capable of remotely controlling many optical power supply type optical nodes can be economically constructed.

According to the present invention, in a system that includes a monitoring control device installed in a power supply environment and one or a plurality of remotely arranged optical line switching nodes, optical power supply and control of a plurality of optical switches included in the nodes and management of an amount of stored power can be simultaneously implemented with a single laser. Thus, it is possible to provide an economical optical line switching node system.

DESCRIPTION OF EMBODIMENTS

Embodiments of the present invention will be described with reference to the appended drawings. The embodiments to be described below are examples of the present invention and the present invention is not limited to the following embodiments. Constituent elements with the same reference signs in the present description and the drawings are identical to each other.

Embodiment 1

Figure 1:
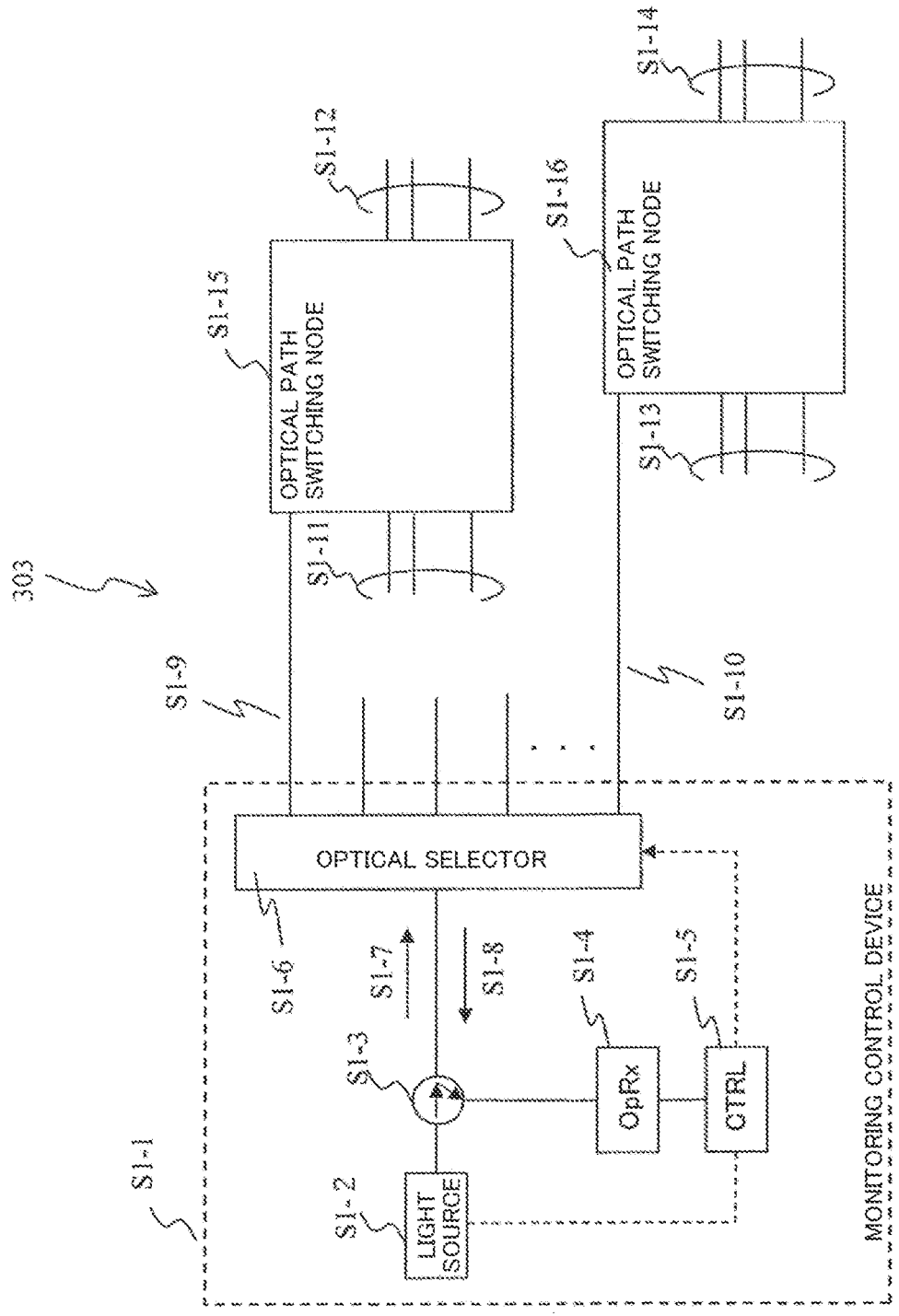
FIG. 1 is a block diagram illustrating a configuration of an optical power supply system and a monitoring control device according to the present invention.

FIG. 1 is a block diagram illustrating a configuration of an optical power supply system 303 according to the present embodiment. The optical power supply system 303 includes a monitoring control device S1-1 and a plurality of optical nodes (S1-15 and S1-16) connected to an optical selector S1-6 of the monitoring control device S1-1 by optical fibers (S1-9 and S1-10). In the present embodiment, an optical line switching node S1 and 7 which has an optical path switching unit for arbitrarily switching a plurality of optical paths and switches an optical signal between a plurality of optical fibers is described as an optical node (S1-15 and S1-16).

The monitoring control device S1-1 includes an optical selector S1-6 that is connected to a plurality of optical nodes (S1-15 and S1-16) which each have a storage battery storing power obtained by optical power supply and output an amount of stored energy of the storage battery as information by optical fibers (S1-9 and S1-10), supply power supply light including a modulation period and a non-modulation period to one selected optical node (S1-15 or S1-16) via the optical fiber (S1-9 or S1-10), and receive light including the information from the optical node; and a control unit S1-5 that determines the optical node to be selected by the optical selector S1-6 based on the amount of stored energy of each of the optical nodes.

The monitoring control device S1-1 will be described in more detail with reference to FIG. 1. The monitoring control device S1-1 is installed in an environment in which power can be provided and includes a light source S1-2, an optical circulator S1-3, an optical receiver S1-4, a controller [control unit] S1-5, and an optical selector S1-6. A laser beam emitted from the light source S1-2 is input to any transmission line optical fiber between a plurality of transmission line optical fibers S1-9 to S1-10 via the optical circulator S1-3 and the optical selector S1-6.

The optical line switching nodes S1-15 and S1-16 are installed at any place, for example, a place where there is no power source, and are connected to the monitoring control device S1-1 via the transmission line optical fiber S1-9 or S1-10. In this way, in the present embodiment, a plurality of optical line switching nodes are provided for one monitoring control device via a plurality of transmission line optical fibers.

A plurality of transmission line optical fibers different from the transmission line optical fiber [hereinafter referred to as input and output optical fibers S1-11 and S1-12 to distinguish them from the transmission line optical fiber S1-9] are connected to an input and an output to the optical line switching node S1-15.

As will be described in detail below, downlink light S1-7 propagating from the monitoring control device S1-1 to each optical line switching node supplies driving power energy of an optical switch included in each optical line switching node S1-15 or S1-16, and a control signal for switching any port is also superimposed on the downlink light S1-7. Uplink light S1-8 from each optical line switching node S1-15 or S1-16 to the monitoring control device is used to communicate a state of each optical line switching node S1-15 or S1-16 to the monitoring control device.

Figure 2:
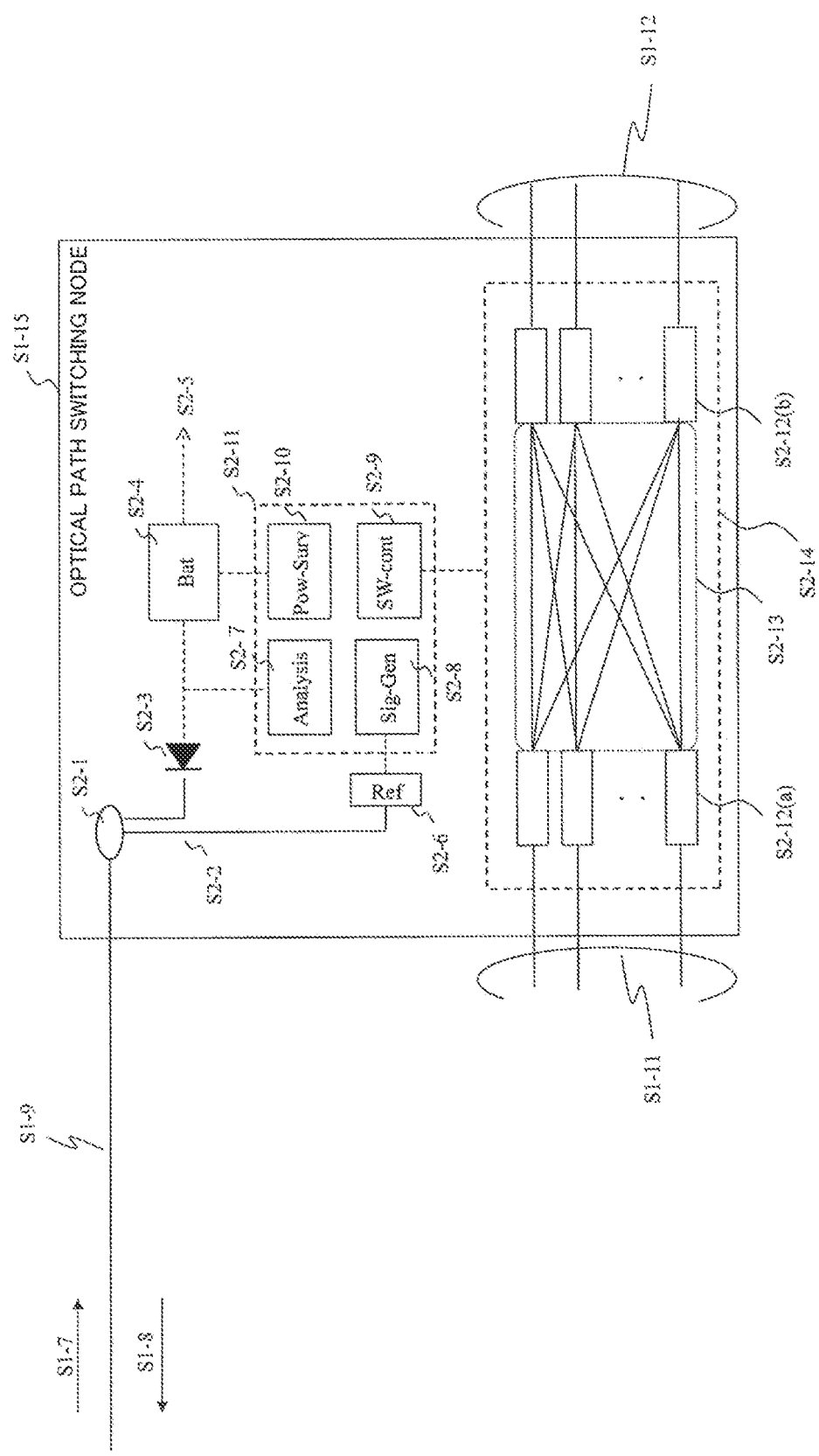
FIG. 2 is a diagram illustrating an internal configuration of an optical node.

FIG. 2 is a diagram illustrating an internal configuration of an optical line switching node, for example, S1-15. The optical line switching node S1-15 receives the downlink light S1-7 from the transmission line optical fiber S1-9 via an optical branching unit S2-1 and a photoelectric conversion element S2-3, converts the downlink light into power, and stores the power in a secondary battery S2-4. Then, the optical line switching node S1-15 supplies the power stored in the secondary battery S2-4 as driving power S2-5 of all the active elements included in the optical line switching node.

The optical branching unit S2-1 is a branching ratio coupler and guides optical power greater than, for example, a branching ratio of 90:10 or 99:1 to the photoelectric conversion element S2-3. The optical branching unit S2-1 is responsible for transmitting part of the downlink light S1-7 through the photoelectric conversion element S2-3 via a path S2-2 and transmitting the remaining light through a reflection optical switch S2-6.

As the photoelectric conversion element S2-3, an element that can receive a wavelength of a laser beam emitted from the light source S1-2 is used. As the photoelectric conversion element S2-3, an element which can be easily available and is suitable for a long wavelength of 1300 nm and 1600 nm band for communication, for example, an element that is formed of indium gallium arsenide and has an open circuit voltage equal to or less than 5V and conversion efficiency of about 30%, can be used. For example, the photoelectric conversion element S2-3 is an optical power supply converter [https://www.kyosemi.co.jp/resources/ja/products/sensor/nir_photodiode/kpc8_t/kpc8_t_spec.pdf]. When power of the laser beam transmitted by the transmission line optical fiber S1-6 is, for example, about +2 dBm, the laser beam can be used for optical power supply. The power varies depending on a device used as optical power supply.

The photoelectric conversion element S2-3 also converts modulated light included in the downlink light S1-7 into an electric signal and inputs the electric signal to a microprocessor S2-11.

The secondary battery S2-4 is used to store electric energy converted by the photoelectric conversion element S2-3. For example, an electric double layer capacitor or the like is used. In supply of a voltage to each active element, it is assumed that the voltage to be supplied can be appropriately adjusted by a DC/DC converter or the like.

The reflection optical switch S2-6 is an optical switch that can execute ON/OFF control of whether part of the downlink light S1-7 is totally reflected. A reflection optical switch S2-8 modulates uplink communication light toward the monitoring control device S1-1 by using the downlink light S1-10. The reflection optical switch S2-6 preferably operates with a low voltage and very small power consumption of a few nW or less. For example, an electrostatic drive type MEMS optical switch which has a small driving power and is generally available can be used as the reflection optical switch S2-6.

The optical line switching node S1-15 further includes an optical cross-connect unit [optical path switching unit] S2-14 which operates with the power stored in the secondary battery S2-4 and arbitrarily switches a plurality of optical paths. The optical cross-connect unit S2-14 is connected to the plurality of input and output optical fibers S1-11 and S1-12 on the input and output sides.

In the example of FIG. 2, the optical cross-connect unit S2-14 includes a plurality of optical switches S2-12. The optical cross-connect unit S2-14 has an optical cross-connection configuration of N×N ports by arranging a plurality of optical switches S2-12a that has one input and N outputs on one side in parallel, arranging a plurality of optical switches S2-14b that has N inputs and one output on the other side in parallel, and connecting them by a cross-wiring S2-13. The cross wiring S2-13 can be freely changed in accordance with an applied application. A wiring such as folded wiring can be also used by folding some of N ports and connecting them to other optical switches on the same side. The number of input and output ports of the optical cross-connect units is not required to be symmetric. An asymmetrical configuration such as M×N can also be implemented. In this way, the optical cross-connect unit S2-14 is configured by the plurality of optical switches as in the present embodiment.

Here, the standby power consumption of the optical cross-connect unit S2-14 has a considerable influence on power management of the entire system. Therefore, it is preferable that the optical switch S2-14 is preferably configured by a self-holding type optical switch in which power at the time of standby is not necessary and a switching state is kept at the time of power loss.

The reason why the optical cross-connect unit S2-14 includes a plurality of self-holding optical switches S2-12 on one side and the other side, respectively, is as follows.

In general, in a self-holding type optical switch that has a plurality of output ports, a phenomenon in which light is output to an unintended port during a switching operation may arise, and thus a communication accident is likely to occur. When a plurality of optical switches are provided on one side and the other side, switching of at least two optical switches is required to switch one optical path. For example, even if one optical switch outputs light to an unintended port, the other optical switch can block the light. Therefore, it is possible to prevent a communication accident occurring due to the output of unintended light.

The optical line switching node S1-15 includes a microprocessor S2-11 for control. The microprocessor S2-11 is mainly configured with four functional blocks (1) and (4).

[1] Downlink Frame Analysis Functional Unit S2-7

The downlink frame analysis functional unit S2-7 is a function of analyzing a downlink frame included in an electric signal of the downlink light S1-7 from the monitoring control device S1-1 received by the photoelectric conversion element S2-3.

The light source S1-2 included in the monitoring control device S1-1 applies intensity modulation to an output laser beam based on a signal from the controller S1-5 and outputs a downlink frame digitized by executing chopping [intensity modulation] to a time to live (TTL) or a CMOS signal, for example. The frame includes a request for node information, switching of the optical switch S2-12, and an execution instruction related to uplink communication.

[2] Uplink Signal Generation Functional Unit S2-8

The uplink signal generation functional unit S2-8 generates the uplink signal light S1-8 by setting a state of the optical switch S2-12 as information [optical path state] in cooperation with a downlink frame analysis function S2-7 and executing ON/OFF modulation of the reflection optical switch S2-6.

[3] Switching Operation Control Functional Unit S2-9

A switching operation control functional unit S2-9 designates any optical switch S2-12 included in the optical cross-connect unit S2-14 which is a switching target in cooperation with the downlink frame analysis function S2-7 and gives an instruction to execute switching to any port. As a specific circuit configuration of the switching operation control functional unit S2-9, an instruction is transmitted to a driving circuit that has any address in bus communication (for example, I2C or the like) in which the microprocessor S2-11 servers as a master to a driving circuit attached to each optical switch, and the operation of switching any optical switch S2-12 can be controlled.

[4] Power Monitoring Functional Unit S2-10

A power monitoring functional unit S2-10 monitors an amount of stored energy of the secondary battery S2-4. The power monitoring function S2-10 always ascertains the amount of stored energy in the secondary battery S2-4 via a voltage monitor or the like, and notifies a monitoring control device of the amount of stored energy via a signal generation function S2-8 based on a set threshold.

As described above, the microprocessor S2-11 implements management of the amount of stored energy of the optical path switching node itself, notification to the monitoring control device S1-1 via uplink communication, and execution of downlink communication for receiving various effective instructions from the monitoring control device S1-1 by causing the four functions to cooperate with each other.

Figure 3:
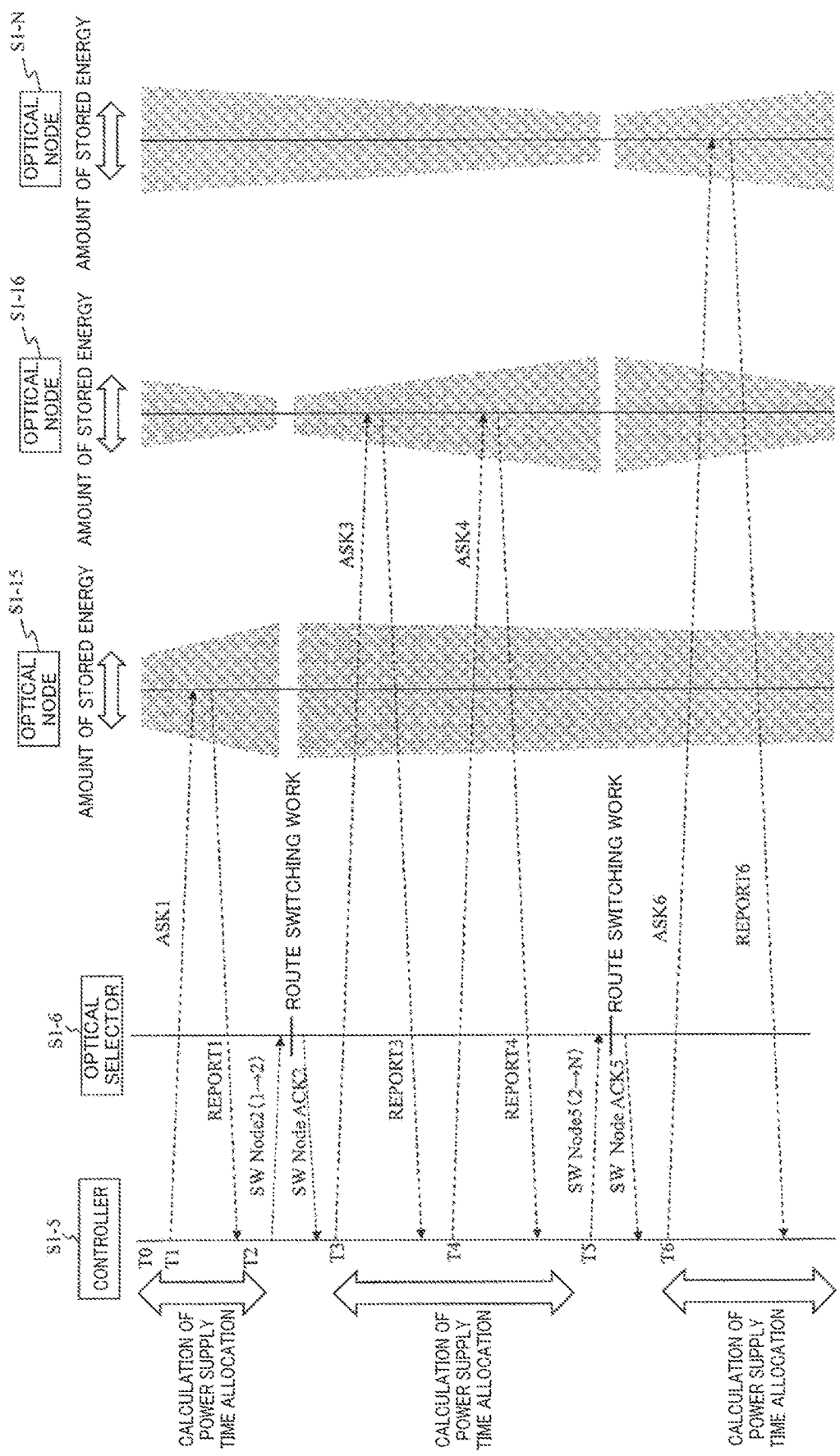
FIG. 3 is a diagram illustrating an overview of communication and power management between the monitoring control device and the optical node according to the present invention.

FIG. 3 is a schematic diagram illustrating an overview of communication and power management between a monitoring control device (the controller S1-5 and the optical selector S1-6) and the optical line switching nodes (S1-15, S1-16, . . . , S1-N) during a standby state, that is, when there is no request for switching the optical cross-connect unit S2-14. At time T0, the optical selector S1-6 enters a state that the downlink light from the monitoring control device is transmitted to the optical line switching node S1-15. At this time, the secondary battery S2-4 of the optical line switching node S1-15 is in a charging state with the downlink light S1-7 from the monitoring control device S1-1.

At time T1, the controller S1-5 notifies the optical line switching node S1-15 of a request (ASK1) for notifying the optical line switching node S1-15 of the state. The optical line switching node S1-15 reports an own amount of stored energy to the controller S1-5 (REPORT1).

At time T2, the controller S1-5 calculates power supply time allocation from the amount of stored energy to be described below. Then, based on a calculation result, the controller S1-5 notifies of the optical selector S1-6 of, for example, an execution instruction (SW Node2) to execute switching to the transmission line optical fiber of the optical line switching node S1-16 in order to switch a power supply target to a subsequent optical node. The optical selector S1-6 executes a notification of an execution result (SW node ACK2) to the controller S1-5 after execution of route switching. Then, the optical line switching node S1-15 enters a discharge state and the optical line switching node S1-16 enters a power supply state.

For example, at a time T3, the controller S1-5 notifies the optical line switching node S1-16 of a request (ASK2) for notifying the state. The optical line switching node S1-16 notifies the controller S1-5 of a report of the own amount of stored energy (REPORT2). However, at this time, the amount of stored energy of the optical line switching node S1-16 does not reach a regulated value and the controller S1-5 does not output an execution instruction to execute switching to the power supply target to a subsequent optical node.

The controller S1-5 recognizes that the amount of stored energy of the optical line switching node S1-16 reaches the regulated value by a request (ASK4) notified of at time T4 (REPORT4) and notifies the optical selector S1-6 of an execution instruction (SW Node5) to execute switching to a transmission line optical fiber of the optical line switching node S1-N. Thereafter, the optical line switching node S1-16 enters a discharge state and the optical line switching node S1-N enters a power supply state.

After time T6, similarly, the controller S1-5 also exchanges ASK/REPORT with each optical line switching node and gives an instruction to switch the optical selector S1-6 based on a calculation result of the power supply time allocation.

Through such exchange, the controller S1-5 has a configuration for circulating power supply to a plurality of optical nodes and can execute alive monitoring of each node at the same time by uplink communication.

Figure 4:
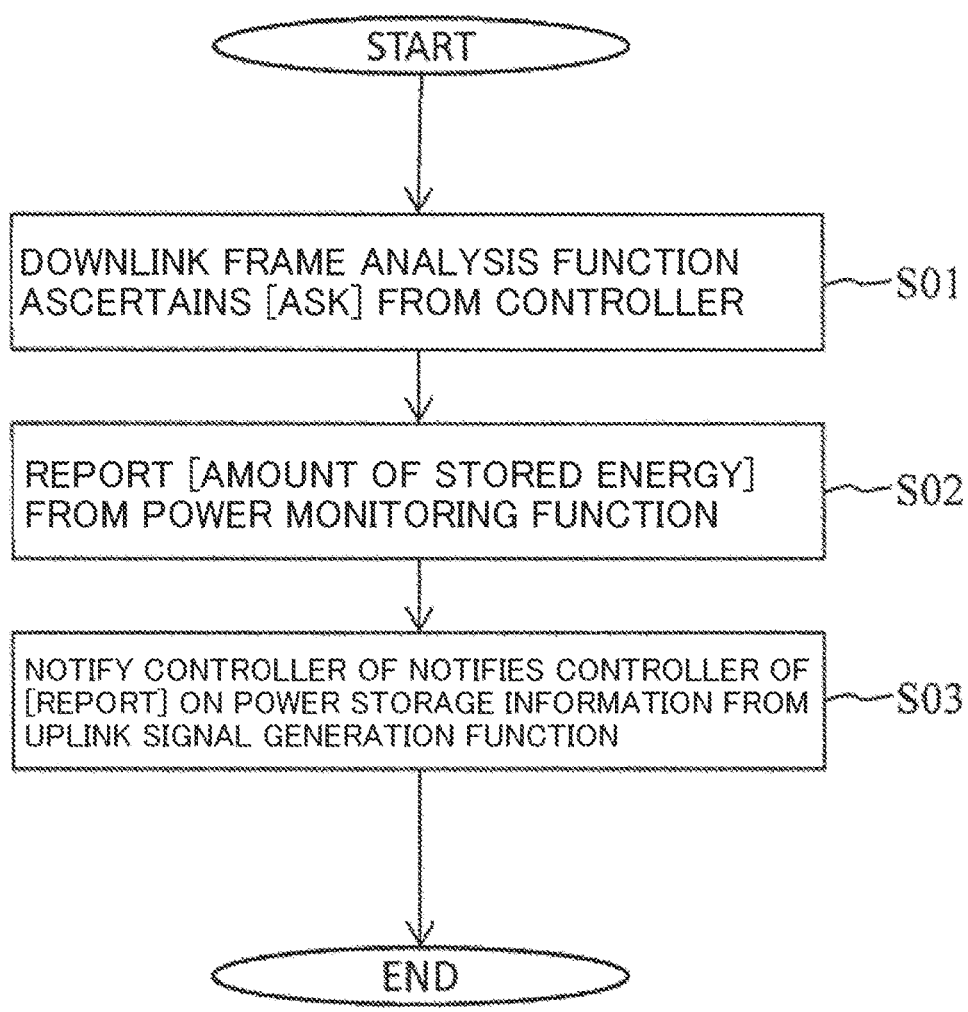
FIG. 4 is a flowchart illustrating an operation of a microprocessor of an optical node.

FIG. 4 is a flowchart illustrating an operation (charge control) of the microprocessor S2-11.

First, the downlink frame analysis function S2-7 ascertains the request (ASK) notified of by the controller S1-5 (step Sol).

Subsequently, the power monitoring function S2-10 confirms the amount of stored energy of the secondary battery S2-4 (step S02).

Then, the uplink signal generation functional unit S2-8 notifies the controller S1-5 of a report (REPORT) on the stored energy amount (step S03).

Figure 5:
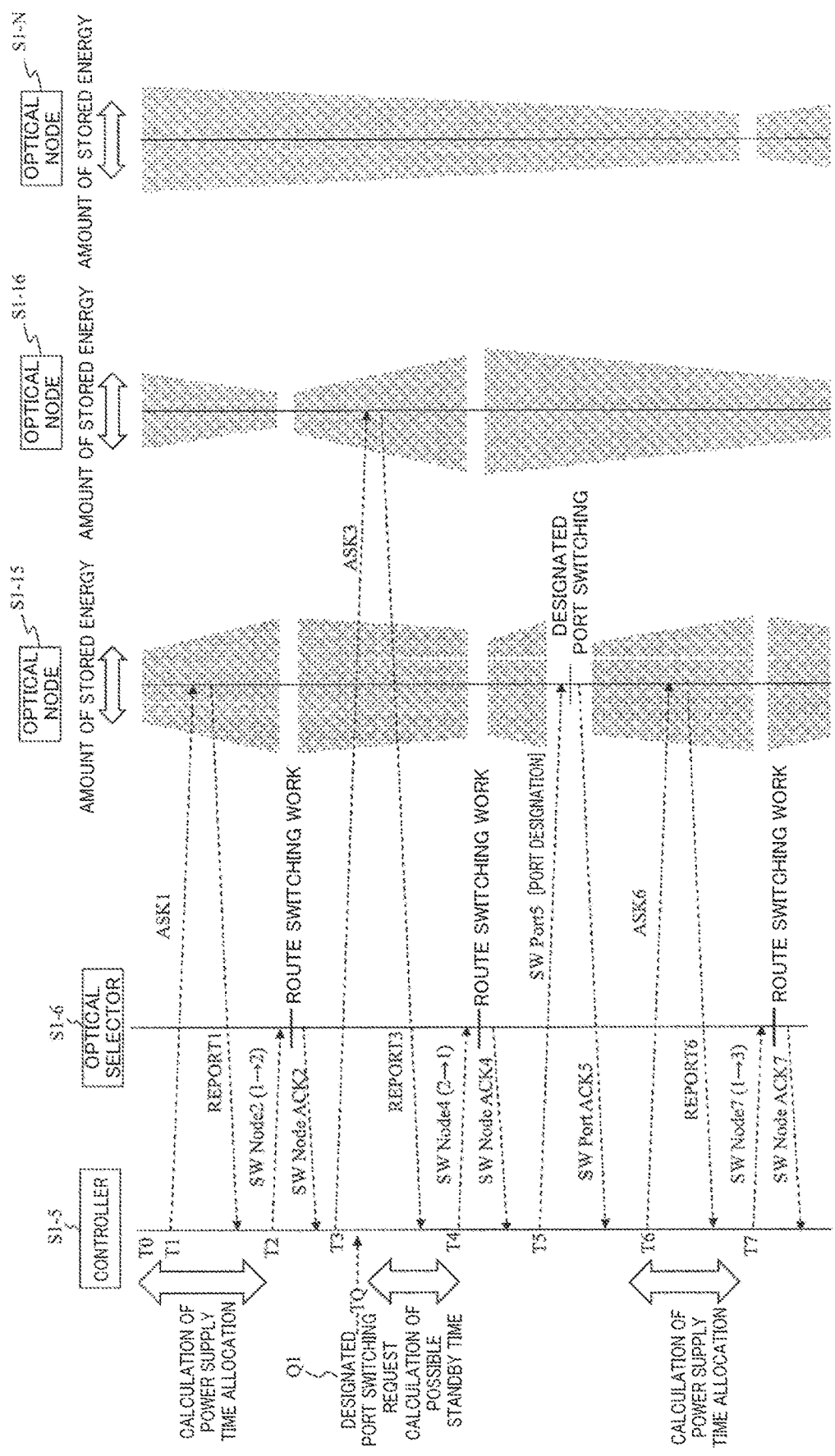
FIG. 5 is a diagram illustrating an overview of communication and power management between the monitoring control device and the optical node according to the present invention.

FIG. 5 is a schematic diagram illustrating an overview of communication and power management between a monitoring control device and an optical line switching node when there is a request for switching an optical path. Until time T3, the same description as that of FIG. 3 is applied.

It is assumed that a request Q1 for switching a designated port is generated to a specific optical node, for example, the optical line switching node S1-15 at a time TQ before time T4, and the controller S1-5 accepts the request. The controller S1-5, as the interruption work of the exchange in FIG. 3, the power supply possible standby time of all the optical nodes belonging to the system including the optical line switching node S1-15 is taken into consideration in response to the switching request Q1. Then, a timing at which route switching of the optical selector S1-6 is executed is determined (for example, time T4 is set as the timing). Then, the controller S1-5 notifies the optical selector S1-6 of an execution instruction (SW Node4) to execute switching back to the transmission line optical fiber of the optical line switching node S1-15 at time T4. This work is preparation work for notifying the optical line switching node S1-15 of port designation. The optical selector S1-6 notifies the controller S1-5 of an execution result after the route switching is executed (SW Node ACK4).

After SW Node ACK4 is received, the controller S1-5 gives a switching execution instruction (SW Port5) to the optical line switching node S1-15 at time T5. The optical line switching node S1-15 executes the switching work of the optical cross connect S2-14 based on the switching execution instruction and notifies the controller S1-5 of the result (SW Port ACK5). After time T6, similarly, the controller S1-5 also exchanges ASK/REPORT with each optical line switching node and gives an instruction to switch the optical selector S1-6 based on a calculation result of power supply time allocation and a designated port switching request. Through such exchange, the controller S1-5 has a configuration for circulating power supply of the plurality of optical nodes to switch a desired optical path and can also execute alive monitoring of each node at the same time by uplink communication.

Figure 6:
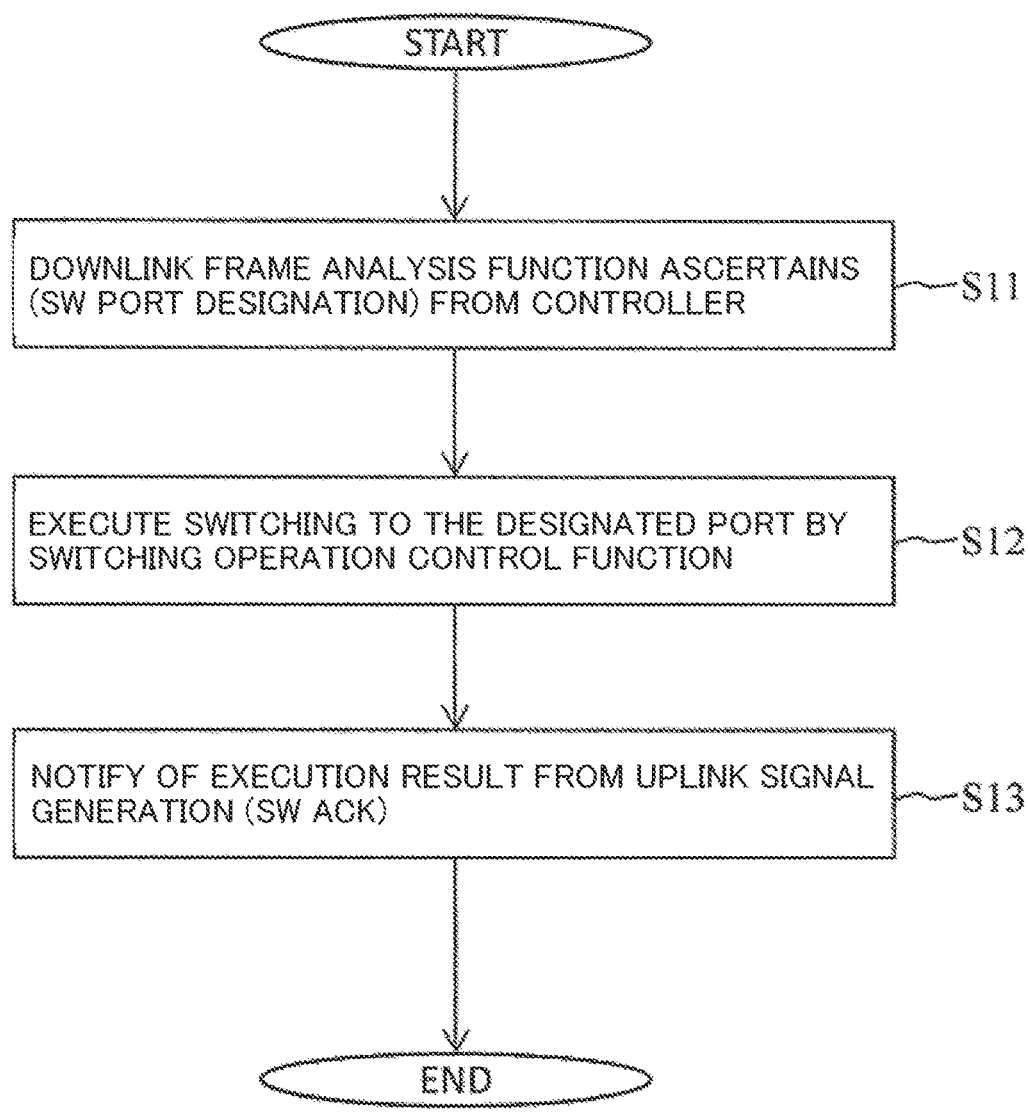
FIG. 6 is a flowchart illustrating an operation of a microprocessor of the optical node.

FIG. 6 is a flowchart illustrating an operation (port switching control) of the microprocessor S2-11.

First, the downlink frame analysis function S2-7 ascertains a request (SW Port) notified of by the controller S1-5 (step S11).

Subsequently, the switching operation control function S2-9 executes switching of an optical switch S2-12 including a target port (step S12).

Finally, the uplink signal generation function S2-8 notifies (SW port ACK) of an execution result (step S13).

Figure 7:
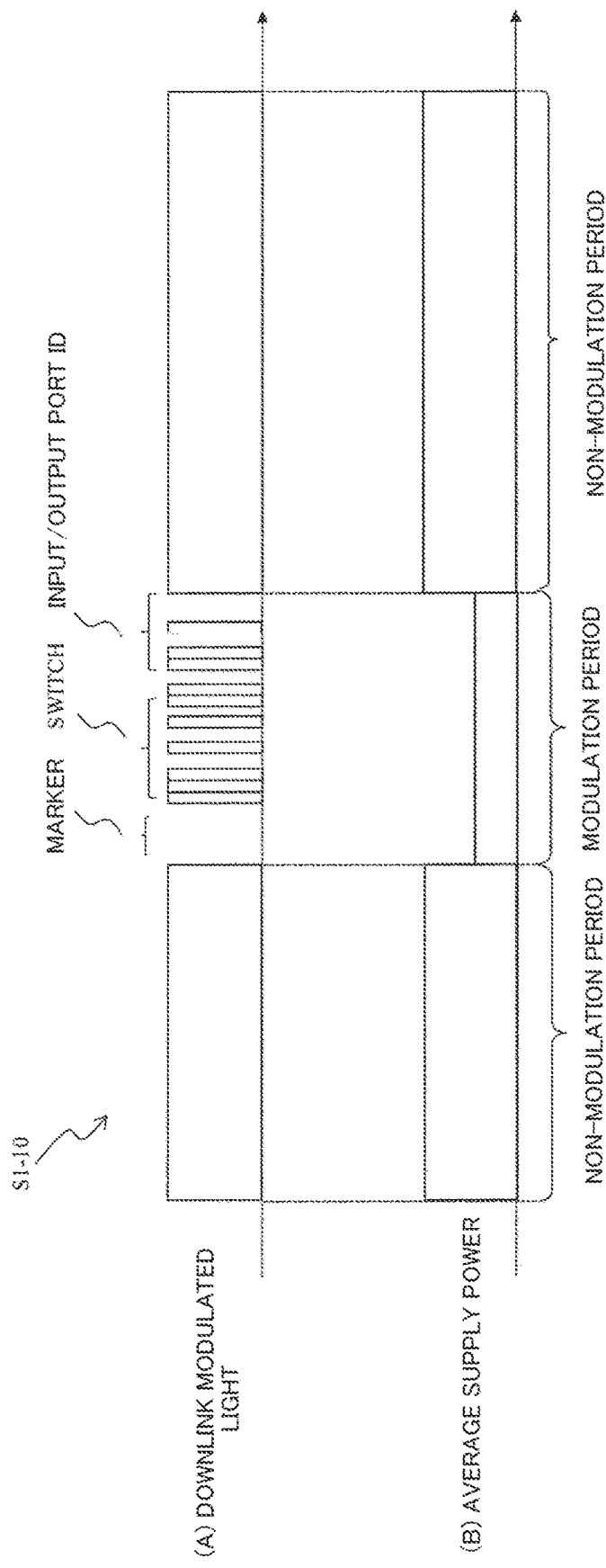
FIG. 7 is a diagram illustrating power supply light transmitted by the monitoring control device according to the present invention.

FIG. 7 is a diagram illustrating the downlink light S1-10. The downlink light S1-10 includes a SWITCH frame for giving an instruction to execute switching of a designated port, and a period is modulated in a part. FIG. 7(A) is a diagram illustrating a modulation state. FIG. 7(B) is a diagram illustrating an average supply power. As illustrating in the drawing, downlink light is steadily supplied to the optical line switching node S1-7 in the state of "1" (a non-modulation period). On the other hand, during a modulation period, intensity of the laser beam is modulated at a frequency equal to or less than, for example, 1 kHz for frame transmission. In the case of ASK and GATE frames, the same is also true except that there is no input/output port ID.

Figure 8:
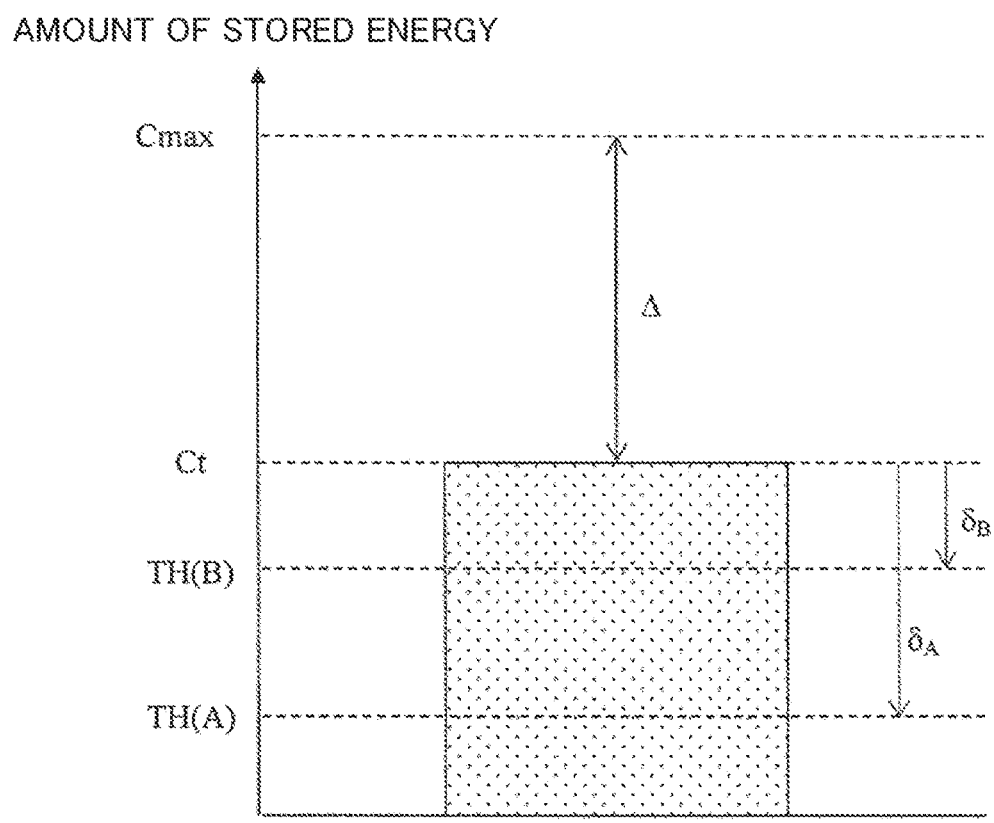
FIG. 8 is a schematic diagram illustrating an amount of stored energy of a storage battery of the optical node.

FIG. 8 is a diagram illustrating an amount of stored energy of the secondary battery S2-4 at a certain time. It is assumed that a maximum storage energy amount Cmax of the optical line switching node is given in accordance with a capacity of the secondary battery S2-4. A difference Δ between the maximum storage energy amount Cmax and a storage energy amount Ct at a certain time is given as a product of a power supply efficiency ε (storage energy amount per time) of a target optical line switching node and an allocatable maximum power supply time $t_{max}$.

$$\Delta = t_{max} \times \varepsilon$$

Although the power supply efficiency ε of the target optical node differs for each node due to an optical loss of a transmission line optical fiber and an individual difference in a component to be used, this can be easily understood by repeating "REPORT" described with reference to FIG. 3 a plurality of times. Accordingly, the allocatable e maximum power supply time $t_{max}$ can be calculated from the difference Δ.

As illustrated in FIG. 8, a certain threshold TH is determined in advance, and a difference δ between the storage energy amount Ct and the threshold TH at a certain time is defined as a product of the possible standby time Tw of the target node and the standby power consumption Pw of the target node.

$$\delta = Tw \times Pw$$

Any threshold can be set in accordance system requirements, for example, a threshold TH(A) for executing minimum uplink communication, and a threshold TH(B) with a level which can immediately correspond to one switching request in addition to the threshold TH(A). Further, the standby power consumption Pw of the target node individually differs depending on components used in the optical node, but it is easy to understand the power consumption Pw in advance. Accordingly, the standby time Tw of the target node can be calculated from the difference δ at a certain time.

Figure 9:
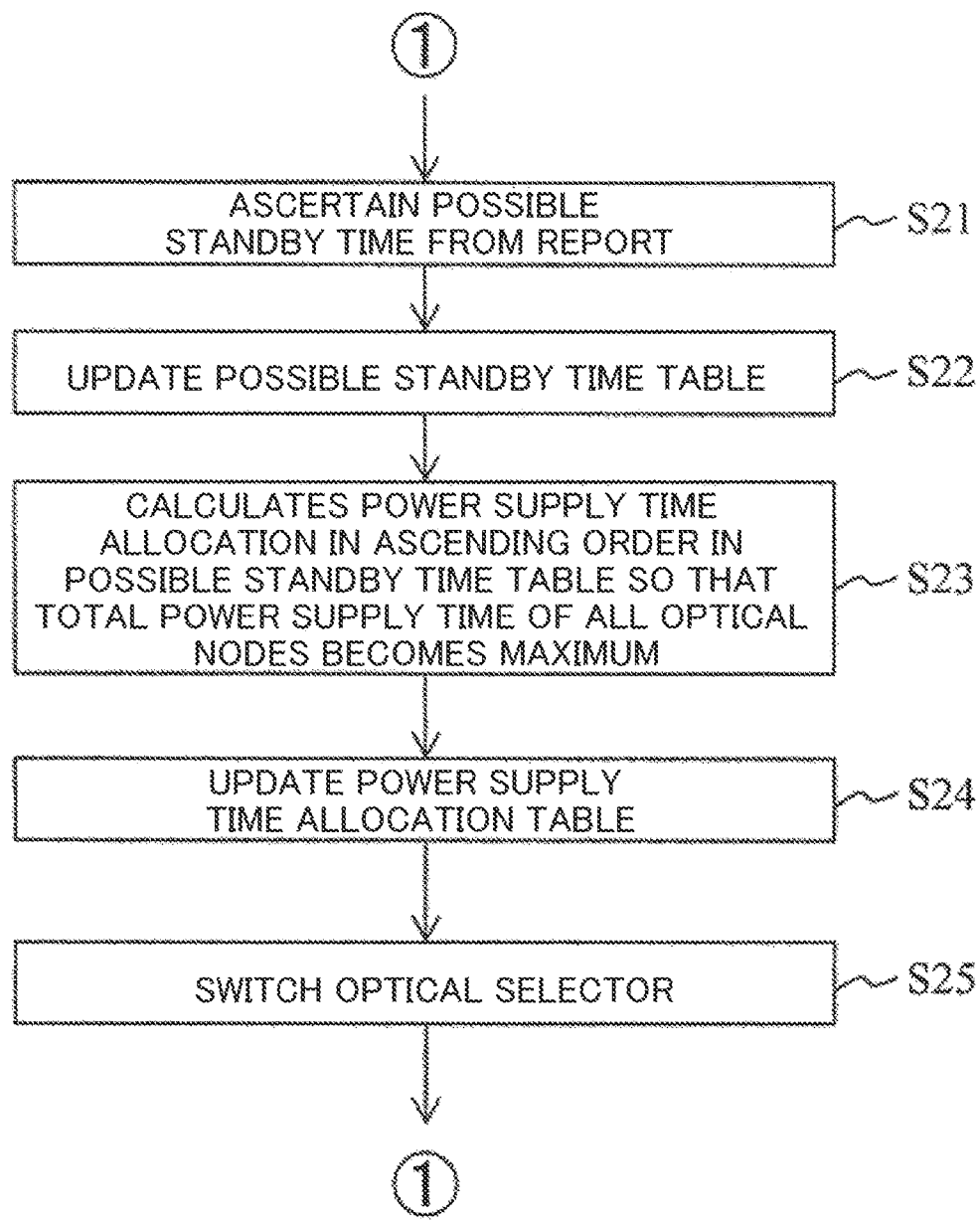
FIG. 9 is a flowchart illustrating switching control of an optical selector executed by the monitoring control device according to the present invention.
Figure 10:
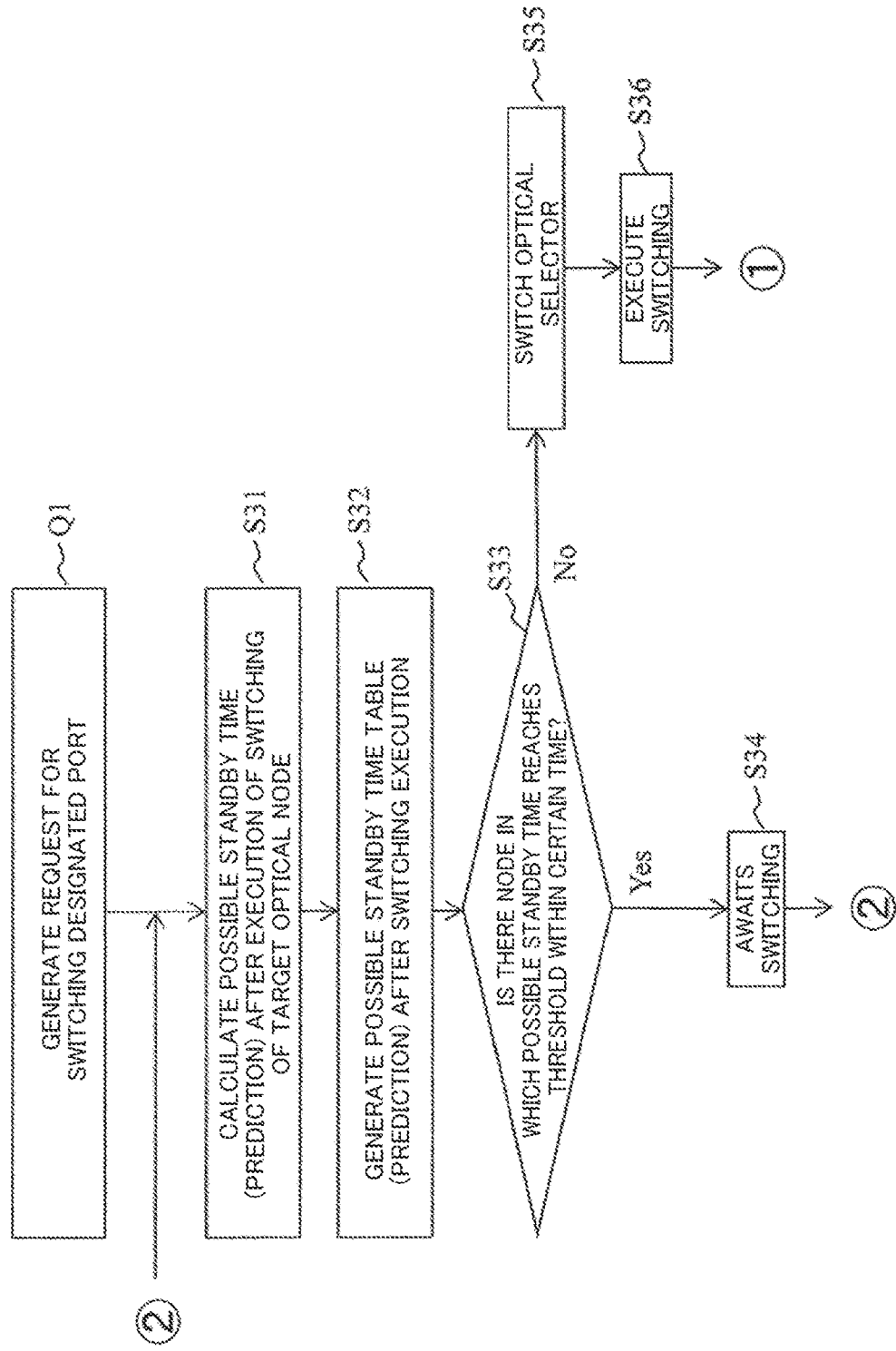
FIG. 10 is a flowchart illustrating the switching control of the optical selector executed by the monitoring control device according to the present invention.

FIGS. 9 and 10 are flowcharts illustrating calculation of power supply time allocation executed by the controller S1-5. FIG. 9 is a diagram illustrating processing at the time of standby, that is, when there is no switching request to the optical cross-connect unit S2-14. The controller S1-5 has two tables, a possible standby time table and a power supply time allocation table.

The controller S1-5 calculates a possible standby time of each optical node based on report notification from each optical node (step S21).

The controller S1-5 writes the possible standby times of all the optical nodes of the system in the possible standby time table and updates the possible standby time table (step S22). The controller S1-5 calculates a power supply time allocation schedule in the ascending order of the possible standby time in the possible standby time table so that a total power supply time of all the optical nodes becomes maximum (step S23).

The controller S1-5 updates the power supply time allocation table in which power supply timings to all the optical nodes of the system are described (step S24).

The controller S1-5 switches the optical selector S1-6 to the corresponding optical node based on the power supply time allocation table (step S25).

The controller S1-5 repeats processing from steps S21 to S25.

The controller S1-5 can understand the possible standby time of each optical node by ascertaining a time until reach of the set threshold. The controller S1-5 uses the possible standby time table to guarantee avoidance of a state in which communication is disabled, shortening of a switching time of an optical cross-connect unit, and the like in accordance with system requirements.

The controller S1-5 determines the power supply time and the order of circulation for each optical node within a range in which the possible standby time is satisfied and updates the power supply time allocation table. At this time, the power supply to the optical node which has reached the maximum power storage amount becomes a loss, and power supply efficiency of the entire system is reduced. Therefore, the controller S1-5 calculates power supply time allocation so that the loss is small, that is, a total power supply time of all the optical nodes becomes maximum, and generates a power supply time allocation schedule. Thus, a system that has excellent power supply efficiency can be constructed.

Further, when a switching request (route switching request) of a designated port is generated for the optical cross-connect unit S2-14 of any optical node (step Q1), the processing of FIG. 10 is interrupted in the processing of FIG. 9.

The controller S1-5 calculates a possible standby time of an optical node predicted after switching execution from an energy consumption amount required to switch the plurality of optical switches S2-12 included in the optical cross connection in the route switching target optical node (step S31).

The controller S1-5 generates the possible standby time table in which possible standby times of all the optical nodes after the execution of the predicted route switching are described (step S32).

The controller S1-5 detects whether or not there is an optical node whose possible standby time reaches a threshold within a fixed time (step S33).

When there is a corresponding optical node ("Yes" in step S33), the controller S1-5 returns to step S31 and repeats the processing from step S31. Conversely, when there is no corresponding optical node ("No" in step S33), the controller S1-5 switches the optical selector S1-6 (step S35) and transmits an execution instruction of route switching to the target optical node (step S36).

The controller S1-5 returns to the processing of FIG. 9 after the processing of FIG. 10 ends.

This processing is executed so that the energy consumption amount required for the operation of the optical switch S2-12 that switches a route is ascertain in advance, the power supply time allocation schedule is changed, and the amount of stored energy of all the optical nodes is not less than a set threshold. The optical switch S2-12 is a self-holding optical switch, and energy consumption amount required for switching can be easily ascertained.

As described above, the optical line switching node and the optical power supply system using the optical line switching node according to the present invention use the optical power of the downlink laser beam supplied from the monitoring control device to the optical node as the driving power, and also use the optical power as a control signal for the optical node in both power management of the optical node and optical switch control inside the optical node by instantaneously modulating the intensity in a time domain. The optical line switching node and the optical power supply system using the optical line switching node according to the present invention can dynamically change power supply time allocation in accordance with an amount of stored energy of each optical line switching node and can optimize power supply efficiency of the entire system.

Therefore, the present invention can implement functions of optical power supply and optical switch control simultaneously with a single laser and can provide an economical optical line switching node system.

REFERENCE SIGNS LIST

303: Optical power supply system
S1-1: Monitoring control device
S1-2: Light source
S1-3: Optical circulator
S1-4: Optical receiver
S1-5: Controller (control unit)
S1-6: Optical selector
S1-7: Downlink light
S1-8: Uplink light
S1-9: Transmission line optical fiber
S1-10: Transmission line optical fiber
S1-11: Transmission line optical fiber
S1-12: Transmission line optical fiber
S1-13: Transmission line optical fiber
S1-14: Transmission line optical fiber
S1-15: Optical node (optical line switching node)
S1-16: Optical node (optical line switching node)
S2-1: Optical branching unit
S2-2: Route
S2-3: Photoelectric conversion element
S2-4: Secondary battery
S2-5: Driving power
S2-6: Reflection optical switch
S2-7: Downlink frame analysis functional unit
S2-8: Uplink signal generating functional unit
S2-9: Switching operation control functional unit
S2-10: Power monitoring functional unit
S2-11: Microprocessor
**S2-12, S2-12(*a*), S2-12(*b*)**: Optical switch
S2-13: Cross wiring
S2-14: Optical cross-connect unit (optical path switching unit)

The invention claimed is:

1. A monitoring control device comprising:
an optical selector connected to a plurality of optical nodes that each includes a storage battery storing power obtained by optical power supply and outputs an amount of stored energy of the storage battery as information via an optical fiber and configured to supply power supply light including a modulation period and a non-modulation period to a selected one of the optical nodes via the optical fiber and receive light including the information from the optical node; and
a controller configured to determine the optical node to be selected by the optical selector based on the amount of stored energy of each of the optical nodes.

2. The monitoring control device according to claim 1, wherein the controller is configured to set a threshold in each of the optical nodes, calculate a possible standby time in which the amount of stored energy decreases and reach the threshold for each of the optical nodes, and determine the optical node to be selected by the optical selector in ascending order of the possible standby time so that a total power supply time of all the optical nodes becomes maximum.

3. The monitoring control device according to claim 2, wherein the optical node includes a functional unit that is configured to execute a predetermined operation using power of the storage battery, and
wherein the controller is configured to:
predict the possible standby time for all the optical nodes after the functional unit of one arbitrary optical node is caused to execute the predetermined operation,
switch the optical selector so that the one arbitrary optical node is selected when all the predicted possible standby times are longer than a predetermined value, and
await the switching of the optical selector when one of the predicted possible standby times is shorter than the predetermined value.

4. An optical power supply system comprising:

a plurality of optical nodes;

an optical selector connected to the plurality of optical nodes that each includes a storage battery storing power obtained by optical power supply and outputs an amount of stored energy of the storage battery as information via an optical fiber and configured to supply power supply light including a modulation period and a non-modulation period to a selected one of the optical nodes via the optical fiber and receive light including the information from the optical node;

a controller configured to determine the optical node to be selected by the optical selector based on the amount of stored energy of each of the optical nodes.

5. The optical power supply system according to claim 4, wherein a functional unit of the optical node is an optical path switching unit that is configured to arbitrarily switch a plurality of optical paths.

6. The optical power supply system according to claim 4, wherein the controller is configured to set a threshold in each of the optical nodes, calculate a possible standby time in which the amount of stored energy decreases and reach the threshold for each of the optical nodes, and determine the optical node to be selected by the optical selector in ascending order of the possible standby time so that a total power supply time of all the optical nodes becomes maximum.

7. The optical power supply system according to claim 6, wherein the optical node includes a functional unit that is configured to execute a predetermined operation using power of the storage battery, and wherein the controller is configured to:

predict the possible standby time for all the optical nodes after the functional unit of one arbitrary optical node is caused to execute the predetermined operation, switch the optical selector so that the one arbitrary optical node is selected when all the predicted possible standby times are longer than a predetermined value, and await the switching of the optical selector when one of the predicted possible standby times is shorter than the predetermined value.

8. The optical power supply system according to claim 7, wherein the functional unit of the optical node is an optical path switching unit that is configured to arbitrarily switch a plurality of optical paths.

* * * * *